(12) United States Patent
Lee et al.

(10) Patent No.: US 8,579,313 B2
(45) Date of Patent: Nov. 12, 2013

(54) ACTIVE ROLL CONTROL SYSTEM

(75) Inventors: Un Koo Lee, Seoul (KR); Sung Bae Jang, Suwon-si (KR); Pil Young Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/563,240

(22) Filed: Jul. 31, 2012

(65) Prior Publication Data

US 2013/0147142 A1    Jun. 13, 2013

(30) Foreign Application Priority Data

Dec. 12, 2011    (KR) .......................... 10-2011-0132869

(51) Int. Cl.
   *B60G 21/055*    (2006.01)
(52) U.S. Cl.
   USPC ...... 280/124.152; 280/124.149; 280/124.106; 280/5.506
(58) Field of Classification Search
   USPC ..................... 280/5.502, 5.506, 5.507, 5.511, 280/124.106, 124.13, 124.134, 124.149, 280/124.152; 74/89.17; 267/188
   See application file for complete search history.

(56) References Cited

U.S. PATENT DOCUMENTS

| 4,892,329 A * | 1/1990 | Kozaki et al. ............... 280/5.511 |
| 5,186,486 A * | 2/1993 | Hynds et al. ........... 280/124.107 |
| 6,175,792 B1 | 1/2001 | Jones et al. |
| 6,254,114 B1 * | 7/2001 | Pulling et al. ............ 280/93.511 |
| 7,325,820 B2 * | 2/2008 | Allen et al. .............. 280/124.15 |
| 7,377,529 B2 * | 5/2008 | Green .................... 280/124.107 |
| 7,427,073 B2 | 9/2008 | Won |
| 7,766,344 B2 | 8/2010 | Buma |
| 8,302,973 B2 | 11/2012 | Lee et al. |
| 8,398,092 B2 * | 3/2013 | Lee et al. .................. 280/5.507 |
| 8,408,559 B1 * | 4/2013 | Lee et al. .................. 280/5.508 |
| 2001/0054801 A1 | 12/2001 | Perello et al. |
| 2009/0288297 A1 * | 11/2009 | Schmidt et al. .......... 29/898.052 |
| 2012/0306177 A1 * | 12/2012 | Thill ...................... 280/124.152 |

FOREIGN PATENT DOCUMENTS

| JP | 5-5557 U | 1/1993 |
| JP | 5-213040 A | 8/1993 |
| JP | 10-297312 A | 11/1998 |
| JP | 2001-520602 A | 10/2001 |
| JP | 2002-114064 A | 4/2002 |
| JP | 2007-182229 A | 7/2007 |
| JP | 4095277 B2 | 3/2008 |
| JP | 2010-42798 A | 2/2010 |
| KR | 1998-045430 A | 9/1998 |

(Continued)

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

An active roll control device varies a position of a stabilizer link connecting a stabilizer bar with a suspension arm such that torsion rigidity of the stabilizer bar is varied to actively control the roll. A penetrating slot is formed in the suspension arm and may include a sliding unit that includes a rail plate disposed in a housing disposed at a lower side of the penetrating slot along a vehicle width direction and connects a connector that is movably disposed on the rail plate with a lower end of the stabilizer link to guide the stabilizer link along a width direction of the vehicle, and a drive unit having a lead screw as a rotation shaft through a three joint mounting portion that engages a screw connector connected to a hinge portion of the stabilizer link to transfer a driving torque to the stabilizer link.

16 Claims, 5 Drawing Sheets

(56) References Cited

FOREIGN PATENT DOCUMENTS

| KR | 10-0629799 | B1 | 9/2006 |
| KR | 10-0665320 | B1 | 12/2006 |
| KR | 10-2007-0104051 | A | 10/2007 |
| KR | 10-2009-0061989 | A | 6/2009 |
| KR | 10-2009-0098039 | A | 9/2009 |
| KR | 10-0980879 | B1 | 9/2010 |

* cited by examiner

ACTIVE ROLL CONTROL SYSTEM

CROSS-REFERENCE TO RELATED APPLICATION

The present application claims priority of Korean Patent Application Number 10-2011-0132869 filed Dec. 12, 2011, the entire contents of which application is incorporated herein for all purposes by this reference.

BACKGROUND OF INVENTION

1. Field of Invention

The present invention relates to an active roll control device of a vehicle. More particularly, the present invention relates to an active roll control system (ARCS) that actively controls roll of a stabilizer bar that is disposed at both suspension arms through a stabilizer link.

2. Description of Related Art

Generally, a suspension system of a vehicle connects an axle with a vehicle body, and prevents vibration or impact that is transferred from the road from being transferred to the vehicle body while driving to enhance ride comfort.

The suspension system includes a chassis spring that reduces impact transferred from the road, a shock absorber that dampens a free vibration of the chassis spring to improve ride comfort, and a stabilizer bar that reduces roll of a vehicle.

The stabilizer bar is fixed on a vehicle body, and end portions thereof are respectively fixed to a lower arm or a strut bar through a stabilizer link.

Accordingly, the stabilizer bar is not operated while the left and right wheels equally move up/down, and reduces the roll of a vehicle body through a torsion elastic force while the left and right wheels are differently moved up/down.

FIG. 1 is a partial perspective view of a suspension system for a vehicle that uses an active roll control device according to a conventional art.

Referring to FIG. 1, an active roll control device of the conventional art improves a roll characteristic of a vehicle by varying rigidity of a stabilizer bar 1 according to a driving condition of a vehicle.

The active roll control device includes a stabilizer bar 1, a stabilizer link 3, a sliding unit 5 that is disposed on a lower arm 7 as a suspension arm, and a drive unit 6.

The stabilizer bar 1 is mounted on a bracket 13 of a sub-frame 11 in a vehicle body side through a mounting bush 15.

Further, one end of the stabilizer link 3 is connected to one end of the stabilizer bar 1 through a ball joint (BJ).

Meanwhile, the lower arm 7 is connected to a lower side of a knuckle 17 through an extended portion 33 of an outside end portion, and a chassis spring seat surface (F) is formed at one side thereof.

Further, the sliding unit 5 is disposed at a lower side of the lower arm 7 through a housing 21, and a connector that is connected to a lower end of the stabilizer link 3 is guided by a motor 27 as the drive unit 6 in a vehicle width direction along a rail plate in the housing 21.

Also, the motor 27 is engaged on an inner side of the housing 21 to move together with the lower arm 7.

The motor 27 has a lead screw which is engaged with the connector in the housing 21 to push or pull the connector.

As described above, a conventional active roll control device operates the motor 27 according to a driving conditions of a vehicle to control a connection position of the stabilizer link 3 on the lower arm 7 such that the roll of the vehicle is actively controlled and turning stability of the vehicle is improved.

However, the conventional active roll control device has the motor 27 that is disposed on the lower arm 7 and the position of the motor 27 is adversely affected by vibration of a vehicle or a chipping of gravel, and therefore there is a drawback that the durability of the motor 27 is deteriorated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an active roll control device having advantages of mounting a motor within a sub-frame such that the motor is not affected by vibration of a vehicle and chipping by gravel to improve the durability thereof.

Various aspects of the present invention provide for an active roll control device that applies a three joint mounting portion on a mounting portion of a motor for a sub-frame such that the motor has three-directional freedom with regard to the sub-frame.

An active roll control device that varies a position of a stabilizer link that connects an end portion of a stabilizer with a suspension arm on the suspension arm such that torsion rigidity of the stabilizer bar is varied to actively control the roll, wherein a penetrating slot is formed at one side of the suspension arm in an up/down direction, may include a sliding unit that includes a rail plate that is disposed in a housing that is disposed at a lower side of the penetrating slot of the suspension arm along a vehicle width direction and connects a connector that is movably disposed on the rail plate with a lower end of the stabilizer link to guide the lower end of the stabilizer link along a width direction of the vehicle, and a drive unit that includes a motor having a lead screw as a rotation shaft through a three-joint mounting portion of the sub-frame and engages the lead screw with a screw connector that is connected to a hinge portion of one side of the stabilizer link to transfer a driving torque to the stabilizer link.

The penetrating slot may be formed near an inner side of a chassis spring seat surface on the suspension arm.

The sliding unit may include a housing of which an upper portion is opened and that is engaged with a lower circumference of the penetrating slot of the suspension arm, a rail plate that is disposed at both sides surface of the inside of the housing, and a connector that includes a slider that is guided along the rail plate and an upper side thereof is connected to a lower end of the stabilizer link through a ball joint.

The ball joint may be formed by assembling a ball stud that is integrally formed at an end portion of the stabilizer link on an upper side of the connector through forcible insertion or orbital forming.

The motor may be a bi-directional servo motor that can control a rotation speed and a rotating direction.

The suspension arm may be a lower arm that connects a sub-frame of a vehicle with a knuckle.

The three joint mounting portion may be a universal joint.

Various aspects of the present invention provide for an active roll control device that adjusts a mounting position of the stabilizer link on the suspension arm through a connector of a driving unit operating a motor that is disposed at a lower portion of the suspension arm according to the driving condition of the vehicle to vary a lever ratio of the stabilizer link such that the roll rigidity of the vehicle is actively controlled and the turning stability of the vehicle is improved.

The motor may be disposed inside the sub-frame to minimize the chipping effect from the vibration of the vehicle and the grave such that the durability of the motor is improved.

A three-joint mounting portion that includes a universal joint may be applied on the mounting portion of the motor in the sub-frame considering the movement of the suspension arm according to the movement of the vehicle body such that the motor has three-directional freedom with regard to the sub-frame to improve the power delivery efficiency of the motor.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
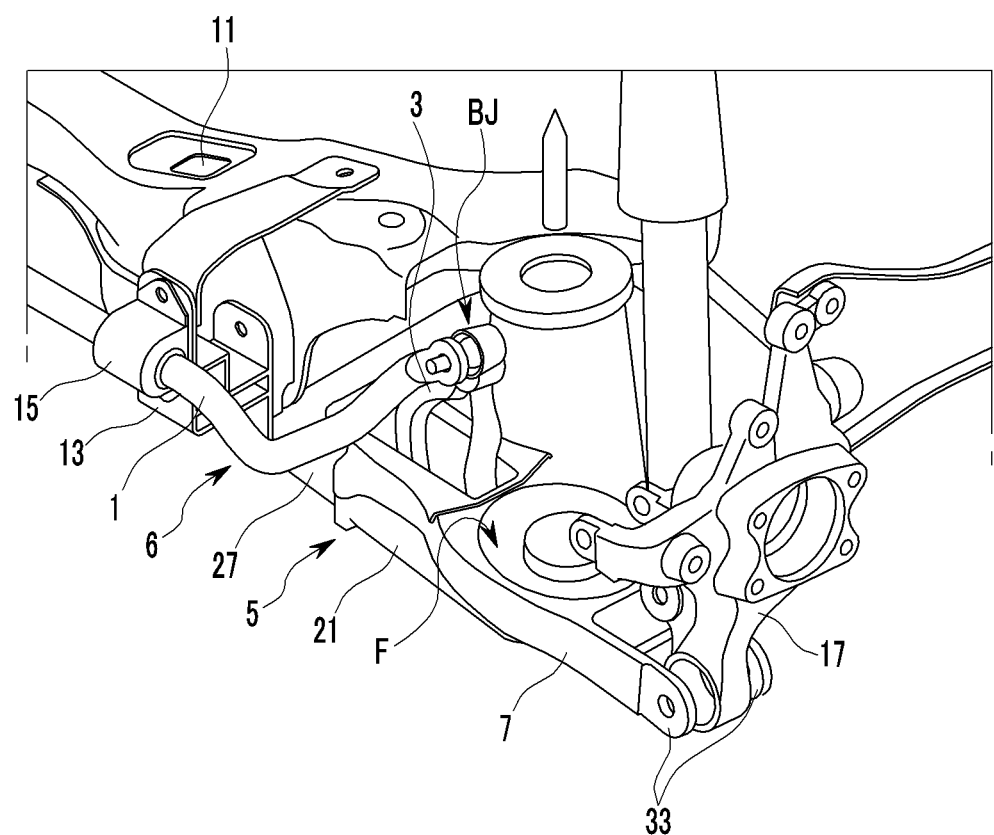
FIG. 1 is a partial perspective view of a suspension system for a vehicle that uses an active roll control device according to a conventional art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

Figure 3:
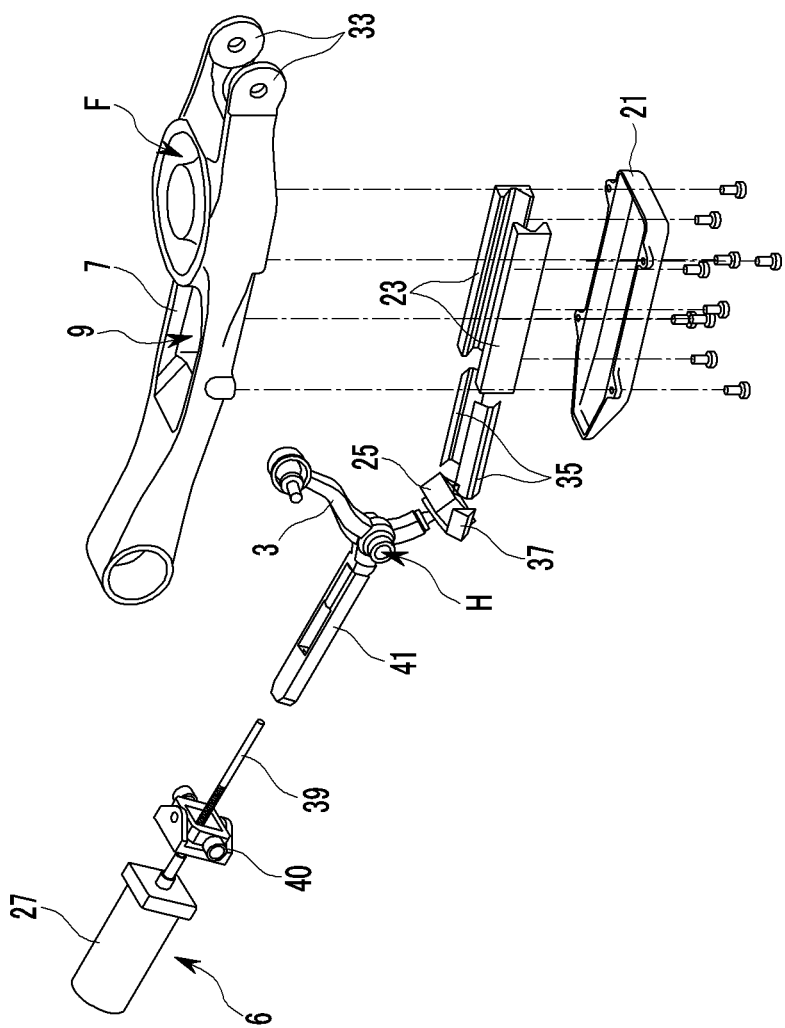
FIG. 3 is an exploded perspective view of an exemplary active roll control device according to the present invention.

Also, for convenience, in an exemplary embodiment of the present invention, a left direction is defined as an inside and a right direction is defined as an outside in FIG. 3.

Figure 2:
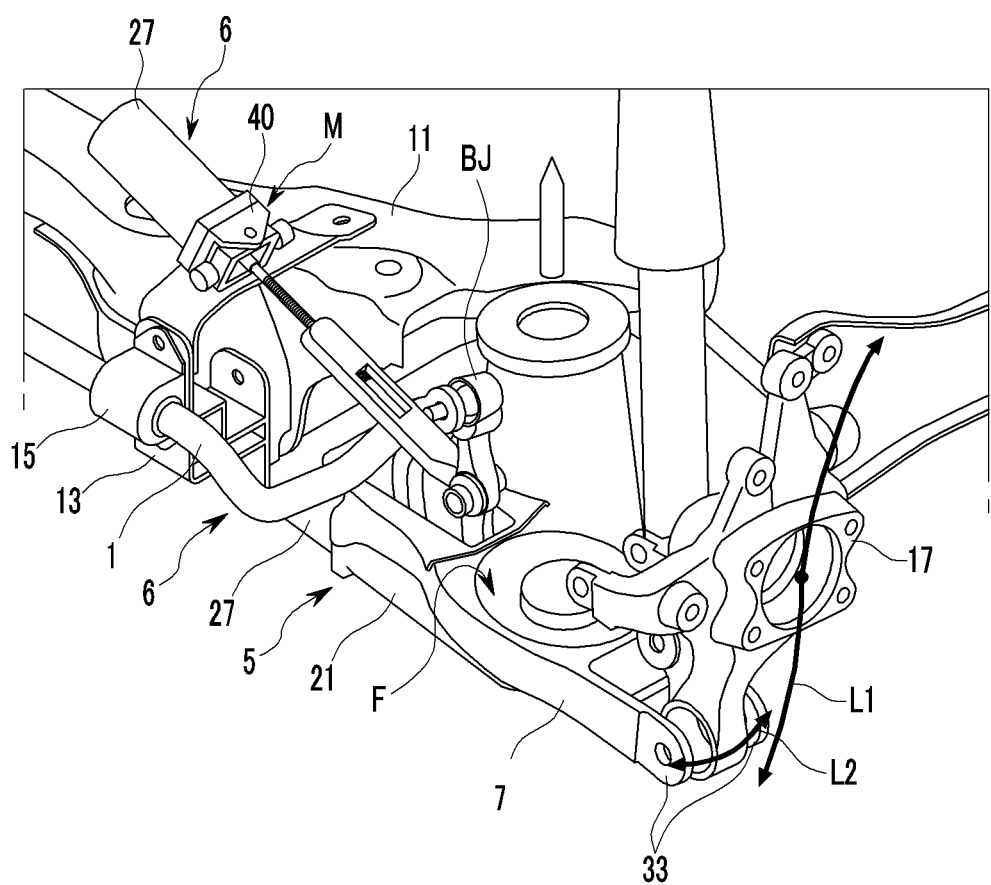
FIG. 2 is a partial perspective view of an exemplary suspension system for a vehicle using an active roll control device according to the present invention.
Figure 4:
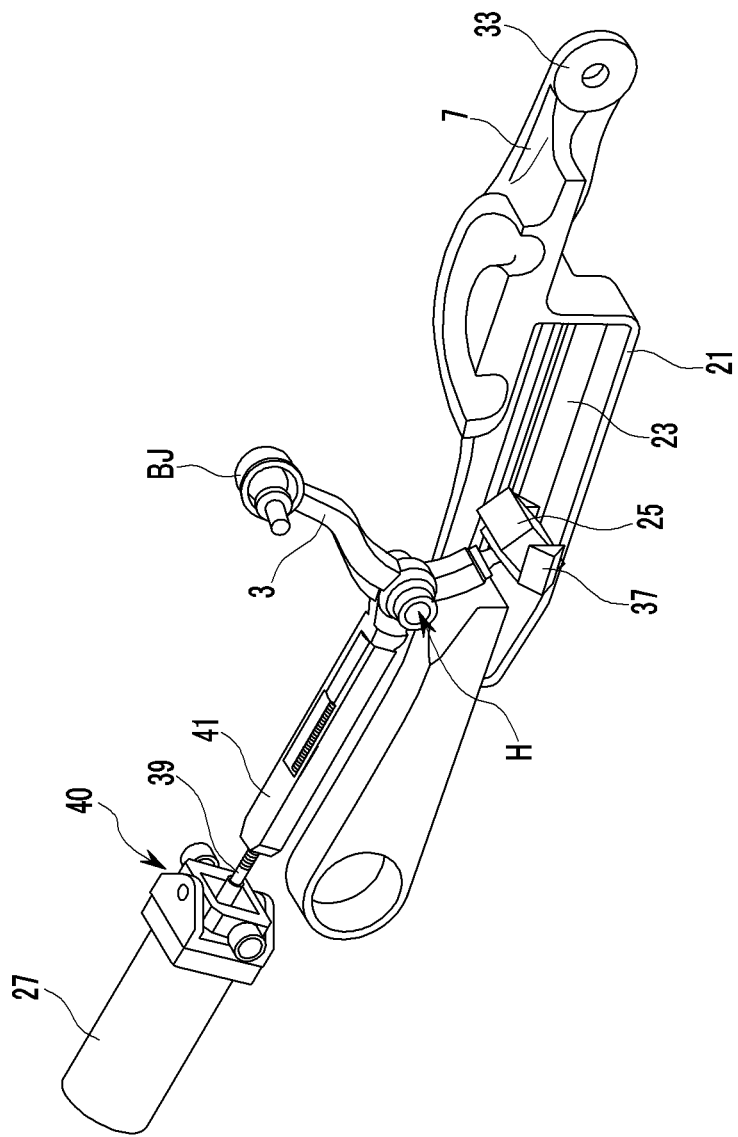
FIG. 4 is a cross-sectional view of an exemplary active roll control device according to the present invention.

FIG. 2 is a partial perspective view of a suspension system for a vehicle using active roll control device according to an exemplary embodiment of the present invention, FIG. 3 is an exploded perspective view of an active roll control device according to an exemplary embodiment of the present invention, and FIG. 4 is a cross-sectional view of an active roll control device according to an exemplary embodiment of the present invention.

Referring to FIG. 2 to FIG. 4, an active roll control device according to an exemplary embodiment of the present invention varies a rigidity value of a stabilizer bar 1 according to a driving condition of a vehicle to actively improve the roll of the vehicle.

That is, the active roll control device includes a stabilizer bar 1, a stabilizer link 3, a sliding unit 5 that is disposed on a lower arm 7 as a suspension arm, and a drive unit 6.

Both sides of the stabilizer bar 1 are mounted on a bracket 13 on a sub-frame through a mounting bush 15.

Further, an upper end of the stabilizer link 3 is connected to one end of the stabilizer bar 1 through a ball joint (BJ).

Meanwhile, the lower arm 7 is connected to a lower side of a knuckle 17 through an extended portion 33 and a penetrating slot 9 is formed at one side in an up/down direction, and the penetrating slot 9 is formed near an inner side of a chassis spring seat portion (F) on the lower arm 7.

A connector 25 is movably disposed on a rail plate 23 that is formed along a vehicle width direction in the housing 21 that is disposed at a lower portion of the penetrating slot 9 of the lower arm 7, and the sliding unit 5 connects the connector with a lower end of the stabilizer link 3 to guide a lower end of the stabilizer link 3 in a vehicle width direction.

Referring to FIG. 3, the housing 21 has a square box shape in which an upper side is opened, and the upper side is engaged on the lower arm 7 along a lower circumference of the penetrating slot 9 by a bolt.

The rail plate 23 includes a guide rail 35 of a pocket shape that is disposed at both sides in the housing 21.

The connector 25 includes a slider 37 that is guided along the guide rail 35 at both sides within the rail plate 23, and the upper side thereof is connected to a lower end of the stabilizer link 3 through a ball joint (BJ).

In this configuration, an upper end of the stabilizer link 3 is connected to one end of the stabilizer bar 1 through a ball joint (BJ) and a lower end thereof is gently bent and penetrates to be connected to the connector 25 through a ball joint (BJ) with a predetermined slant angle.

Here, in a ball joint (BJ) that connects the stabilizer link 3 with the connector 25, a ball stud that is integrally formed at one end of the stabilizer link 3 is assembled to an upper side of the connector 25 through forcible insertion or an orbital forming.

The drive unit 6 includes a motor 27 that is disposed at one side of the sub-frame 11 through a three joint mounting portion (M).

The motor 27 has a lead screw 39 as a rotation shaft, and the lead screw 39 is engaged with a screw connector 41 that is connected to a hinge portion (H) of one side of the stabilizer link 3 and offers a driving torque to move the stabilizer link 3 forward or backward.

Here, the motor 27 can be a bi-directional servo motor that can control the rotation speed and the rotating direction.

Also, the three joint mounting portion (M) can includes a universal joint 40 such that the motor 27 has three-directional freedom on the sub-frame 11.

Accordingly, the active roll control device operates the motor 27 according to the driving conditions of the vehicle to adjust the lower arm 7 connection position of the stabilizer link 3.

Then, a lever ratio of the stabilizer link 3 is varied to vary the rigidity value of the stabilizer bar 1 such that the roll rigidity of the vehicle is actively controlled.

Figure 5:
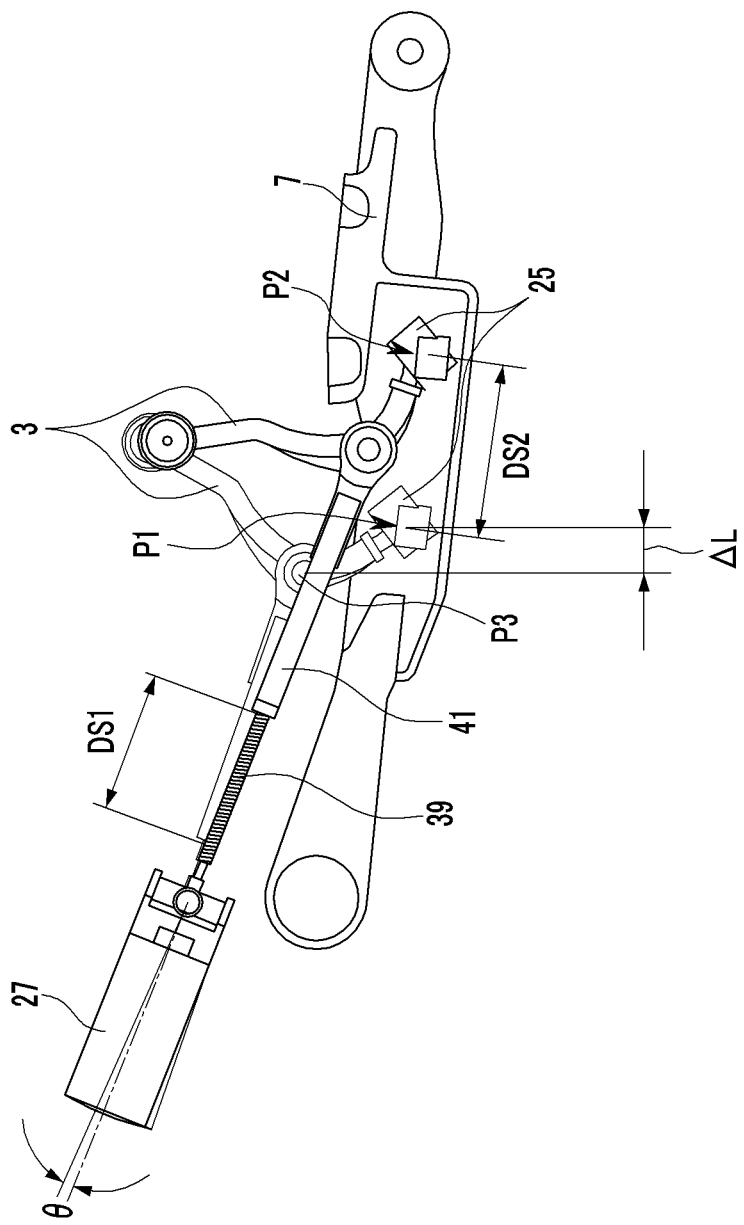
FIG. 5 shows an operational state of an exemplary active roll control device according to the present invention.

Referring to FIG. 5, the operation of the active roll control device that is described above will be described.

That is, the connector 25 determining the lower arm 7 connection position of the stabilizer link 3 is positioned at "P1" of FIG. 5 in a normal condition such that the rigidity value of the stabilizer bar 1 is normally maintained.

In this condition, when the vehicle turns, a controller controls the drive motor 27 depending on the signals of an acceleration sensor, a height sensor, and a steering sensor.

Then, the screw connector 41 on the lead screw 39 is moved, and the connector 25 is moved to "P2" of FIG. 6 to increase a lever ratio of the stabilizer link 3 such that the rigidity value of the stabilizer bar 1 is increased.

As described above, the active roll control device according to an exemplary embodiment of the present invention adjusts the position of the stabilizer link 3 on the lower arm 7 through the operation of the drive motor 27 to vary the lever ratio of the stabilizer link 3 such that the roll rigidity of the vehicle is actively controlled and the turning stability of the vehicle is improved.

Meanwhile, in FIG. 5, a connection point (P1) of the connector 25 and a connection point (P3) of the screw connector 41 for the stabilizer link 3 have a difference of as long as a predetermined length (ΔL), and therefore an operation stroke DS2 of the connector 25 becomes larger than that of the operation stroke DS1 of the screw connector 41 by the motor 27.

In this process, the rotation angle that is generated on the motor by the length difference between P1 and P3 is absorbed by the universal joint.

In addition, the universal joint 40 has freedom in three directions to absorb a curved line L2 movement of the lower arm 7 while a vehicle shaft moves along a curved line L1 during a bump or rebound of the vehicle body to improve the power delivery efficiency and the durability of the motor.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active roll control device comprising:
    a suspension arm including a penetrating slot is formed in one side of the suspension arm in an up/down direction and a housing disposed at a lower side of the penetrating slot along a vehicle width direction;
    a variable stabilizer link that interconnects an end portion of a stabilizer bar and the suspension arm such that torsion rigidity of the stabilizer bar is varied to actively control vehicle roll;
    a sliding unit that includes a rail plate that is disposed in the housing and that connects a connector that is movably disposed on the rail plate with a lower end of the stabilizer link to guide the lower end of the stabilizer link along a width direction of a vehicle; and
    a drive unit that includes a motor having a lead screw as a rotation shaft through a three-joint mounting portion of a sub-frame disposed at a lower side of a vehicle frame and engages the lead screw with a screw connector that is connected to a hinge portion of one side of the stabilizer link to transfer a driving torque to the stabilizer link.

2. The active roll control device of claim 1, wherein the penetrating slot is formed near an inner side of a chassis spring seat surface on the suspension arm.

3. The active roll control device of claim 2, wherein the suspension arm is a lower arm that connects the sub-frame of the vehicle with a knuckle.

4. The active roll control device of claim 1, wherein the sliding unit includes:
    a housing of which an upper portion is opened and that is engaged with a lower circumference of the penetrating slot of the suspension arm;
    a rail plate that is disposed at both sides surface of the inside of the housing; and
    a connector that includes a slider that is guided along the rail plate and an upper side thereof is connected to a lower end of the stabilizer link through a ball joint.

5. The active roll control device of claim 3, wherein the ball joint is formed by assembling a ball stud that is integrally formed at an end portion of the stabilizer link on an upper side of the connector through forcible insertion or orbital forming.

6. The active roll control device of claim 1, wherein the motor is a bi-directional servo motor that can control a rotation speed and a rotating direction.

7. The active roll control device of claim 1, wherein the suspension arm is a lower arm that connects the sub-frame of the vehicle with a knuckle.

8. The active roll control device of claim 3, wherein the suspension arm is a lower arm that connects the sub-frame of the vehicle with a knuckle.

9. The active roll control device of claim 1, wherein the three-joint mounting portion is a universal joint.

10. An active roll control device comprising:
    a suspension arm including a penetrating slot is formed in one side of the suspension arm in an up/down direction;
    a variable stabilizer link that interconnects an end portion of a stabilizer bar and the suspension arm such that torsion rigidity of the stabilizer bar is varied to actively control vehicle roll;
    a housing of which an upper portion is opened and that is engaged with a lower circumference of the penetrating slot of the suspension arm;
    a rail plate that is disposed at both side surfaces of the inside of the housing;
    a connector that includes a slider that is guided along the rail plate and an upper side thereof is connected to a lower end of the stabilizer link through a ball joint;
    a motor having a lead screw as a rotation shaft through a three-joint mounting portion of a sub-frame disposed at a lower side of a vehicle frame; and
    a screw connector of which one end thereof is connected to a hinge portion of one side of the stabilizer link and the other end thereof is connected to the lead screw.

11. The active roll control device of claim 10, wherein the penetrating slot is formed near an inner side of a chassis spring seat surface on the suspension arm.

12. The active roll control device of claim 11, wherein the suspension arm is a lower arm that connects the sub-frame of the vehicle with a knuckle.

13. The active roll control device of claim 10, wherein the ball joint is formed by assembling a ball stud that is integrally formed at an end portion of the stabilizer link on an upper side of the connector through forcible insertion or orbital forming.

14. The active roll control device of claim 10, wherein the motor is a bi-directional servo motor that can control a rotation speed and a rotating direction.

15. The active roll control device of claim 10, wherein the suspension arm is a lower arm that connects the sub-frame of the vehicle with a knuckle.

16. The active roll control device of claim 10, wherein the three joint mounting portion is a universal joint.

\* \* \* \* \*